US005510853A

United States Patent [19]

Kawano

[11] Patent Number: 5,510,853
[45] Date of Patent: Apr. 23, 1996

[54] AUTOMATIC GAIN CONTROL CIRCUIT FOR STABILIZING THE LEVEL OF A REPRODUCED COLOR SIGNAL

[75] Inventor: Mitsumo Kawano, Saitama, Japan

[73] Assignee: Kabushiki Kaisha Toshiba, Kawasaki, Japan

[21] Appl. No.: 181,100

[22] Filed: Jan. 13, 1994

[30] Foreign Application Priority Data

Jan. 13, 1993 [JP] Japan .................................. 5-004042

[51] Int. Cl.$^6$ ...................................................... H04N 5/52
[52] U.S. Cl. ........................... 348/678; 348/609; 348/255
[58] Field of Search ........................ 348/678, 679, 348/255, 609, 453, 505; 358/326, 328, 329, 340; H04N 5/52

[56] References Cited

U.S. PATENT DOCUMENTS

| 4,524,380 | 6/1985 | Shibata et al. ............................ 358/329 |
| 4,969,033 | 11/1990 | Yamada et al. ........................... 358/329 |
| 4,989,074 | 1/1991 | Matsumoto ................................ 348/678 |

Primary Examiner—James J. Groody
Assistant Examiner—Cheryl Cohen
Attorney, Agent, or Firm—Banner & Allegretti, Ltd.

[57] ABSTRACT

An automatic gain control circuit for processing a reproduced color signal in a VCR which may include first and second feedback loops respectively positioned before and after a comb filter. In the first feedback loop, the color signal is amplified by a first variable gain amplifier and supplied to both a first burst detector and the comb filter via a frequency converter and a band-pass filter. The first burst detector detects the peak level of the burst signal included in the color signal and controls the gain of the first amplifier for stabilizing the level of the burst signal. The comb filter removes cross-talk components from the color signal and supplies an output signal to the second feedback loop. In the second feedback loop, the output signal is amplified by a second variable gain amplifier and supplied to a second burst detector. The second burst detector detects the level of the burst signal included in the output signal and controls the gain of the second amplifier for stabilizing the level of the output signal.

7 Claims, 1 Drawing Sheet

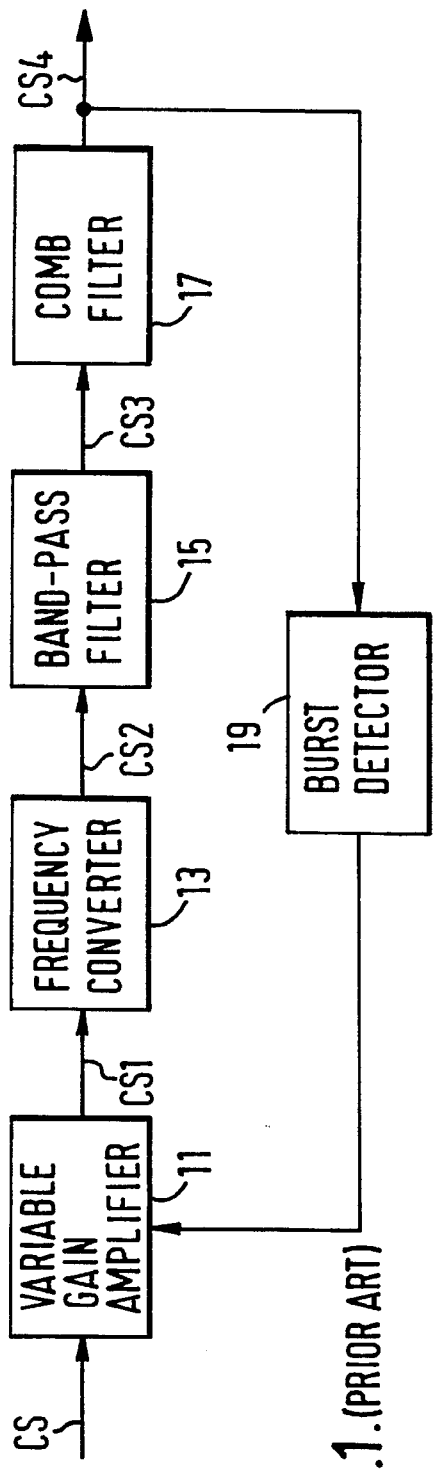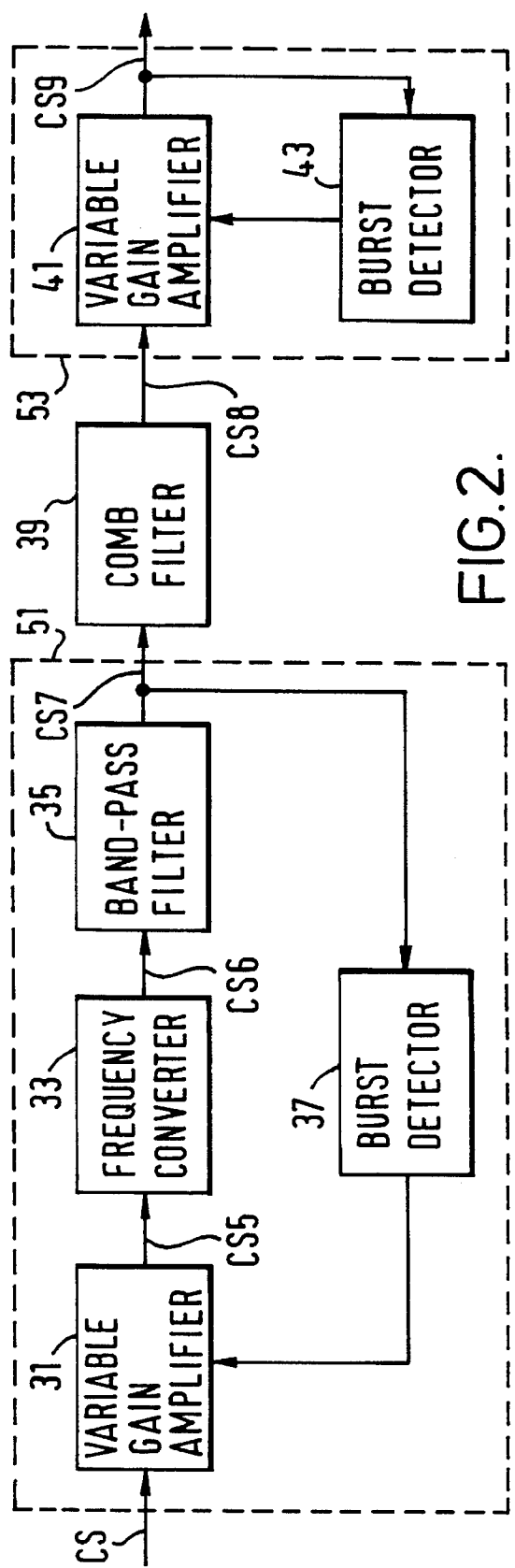

AUTOMATIC GAIN CONTROL CIRCUIT FOR STABILIZING THE LEVEL OF A REPRODUCED COLOR SIGNAL

FIELD OF THE INVENTION

The present invention generally relates to the field of automatic gain control (AGC) circuitry, and more particularly, is directed to an AGC circuit including a comb filter for use in a color signal reproducing circuit, such as a video cassette recorder (VCR), for stabilizing the level of the reproduced color signal.

BACKGROUND OF THE INVENTION

In a VCR utilizing the NTSC format, for example, a color signal having the frequency of 3.58 MHz is converted to the signal at a lower frequency, and is then recorded on a video tape. A phase inversion is applied by a reproducing circuit, to the color signal during every other horizontal scanning period in order to eliminate cross-talk from adjacent tracks on the tape. Accordingly, during the reproducing operation, the color signal is re-converted to 3.58 MHz, and then added to the signal of the next horizontal scanning period by a comb filter in order to eliminate cross-talk.

FIG. 1 is a block diagram illustrating a known AGC circuit which is used for stabilizing the level of the reproduced color signal in a VCR and for eliminating cross-talk. In the AGC circuit of FIG. 1, a low frequency color signal CS which is read by a magnetic head from a video tape, is amplified by a variable gain amplifier 11; signal CS is inverted during every other horizontal scanning period before being supplied to amplifier 11. The amplified color signal CS1 is then converted by frequency converter 13, to a color signal CS2 having the baseband frequency of 3.58 MHz. Band-pass filter 15 extracts from signal CS2 only the baseband color signal CS3 and supplies it to comb filter 17. Comb filter 17 reduces, and preferably eliminates, the cross-talk components and supplies an output signal CS4 to both the next processing stage and a burst detector 19. In particular, comb filter 17 adds the inverted signal CS3 with the corresponding (non-inverted) CS3 signal of the next horizontal scanning period. This has the effect of eliminating cross-talk. Burst detector 19 detects the level of the burst signal included in signal CS4 and supplies amplifier 11 with a control signal for controlling its gain so the burst signal level remains constant. By this process, an AGC feedback loop is achieved for stabilizing the level of the reproduced color signal.

There is comparatively less cross-talk in the standard play (SP) mode of a VCR versus the cross-talk in its extended play (EP) mode. This is due to the width of the recording track, in the EP mode, being narrower than the track width in the SP mode. During the EP mode, signal levels of the reproduced color signals CS will vary greatly from horizontal period to horizontal period. For example, the color signal level during the previous horizontal scanning period may be twice that of the signal in the SP mode, while its level in the following horizontal scanning period may be approximately zero. In addition, as greater cross-talk components are included in signal CS, the level of output signal CS4 will decrease due to the removal of the cross-talk components by comb filter 17. Thus, in the above AGC feedback loop, signal CS must be amplified to a greater extent when its level is sufficiently high due to cross-talk.

Considering the cross-talk in the EP mode, the dynamic range of the circuits of FIG. 1 prior to comb filter 17 must have twice the level necessary for processing the color signal in the SP mode. During the SP mode, only half of the dynamic range of frequency converter 13 and band-pass filter 15 is used for processing the color signals. In other words, frequency converter 13 and band-pass filter 15 must have an unnecessarily large dynamic range for operation in the SP mode. As a result, the color signals processed by the circuit of FIG. 1 suffer disadvantages; for example, the signals are intolerant to disturbances such as carrier leaks in frequency converter 13, and noise in band-pass filter 15, particularly, if an active filter is utilized.

Moreover, since the AGC feedback loop includes comb filter 17 which has a large time delay, the response of the loop cannot be appreciably increased. As a result, the AGC circuit of FIG. 1 will likely produce a flicker along the upper portion of the screen.

SUMMARY OF THE INVENTION

In accordance with the present invention, an AGC circuit can include first and second feedback loops respectively positioned before and after the noise elimination filter. The first feedback loop functions to stabilize the signal level supplied from the previous processing stage to the noise elimination filter before noise, (e.g., cross-talk) is reduced or eliminated. In addition, the second feedback loop functions to stabilize the signal level supplied from the noise filter to the next processing stage.

It is therefore an object of the present invention to provide an AGC circuit wherein an optimum dynamic range can be set independent of the signal noise level.

Another object of the present invention is to provide an AGC circuit wherein the response of feedback loop can be effectively increased.

The above and other objects of the present invention will become clearer upon an understanding of the illustrative embodiments described below. Various advantages which may not be specifically referred to herein should be readily apparent to those skilled in the art.

BRIEF DESCRIPTION OF THE DRAWINGS

FIG. 1 is a block diagram illustrating a conventional AGC circuit for use in a VCR.

FIG. 2 is a block diagram illustrating an AGC circuit in accordance with an embodiment of the present invention.

DETAILED DESCRIPTION OF A PREFERRED EMBODIMENT

A representative embodiment of the present invention will now be explained with reference to the accompanying drawings.

FIG. 2 is a block diagram illustrating an AGC circuit in accordance with an embodiment of the present invention. In this embodiment, the AGC circuit, containing a first feedback loop 51 and a second feedback loop 53, is employed for stabilizing in a VCR the level of a reproduced color signal.

In the AGC circuit of FIG. 2, a low frequency color signal CS is read from a video tape by a magnetic head (not shown) and amplified by variable gain amplifier 31. The amplified color signal CS5 is converted by frequency converter 33 to color signal CS6 having a baseband frequency. Band-pass filter 35 extracts only the baseband color signal CS7 from signal CS6 and supplies signal CS7 to burst detector 37 and comb filter 39. Burst detector 37 detects the peak level of the burst signal included in signal CS7 and supplies variable gain amplifier 11 with a control signal for controlling the gain of amplifier 11 to maintain the burst signal level constant. Since variable gain amplifier 31 alters the amplification or gain in accordance with the control signal, signal CS5 will be maintained at a constant level. Thus, the level of signal CS7 supplied from band-pass filter 35 will be constant as well.

Circuits 31, 33, 35 and 37 comprise the first feedback loop 51. The gain of variable gain amplifier 31 is adjusted so that the output signal (color signal CS7) has a high level notwithstanding the removal of cross-talk components by comb filter 39.

Comb filter 39 reduces, and preferably eliminates, cross-talk components from color signal CS7 and supplies output signal CS8 to variable gain amplifier 41. The cross-talk component is removed in comb filter 39 by adding color signal CS7 and the corresponding signal of the next horizontal scanning period. By this process, the greater the cross-talk contained in signal CS7, the lower the level of signal CS8 supplied from comb filter 39.

Color signal CS8 is supplied to variable gain amplifier 41 and is amplified; the amplified signal CS9 is supplied to both the next processing stage and burst detector 43. Burst detector 43 detects the level of the burst signal included in color signal CS9 and supplies variable gain amplifier 41 with a control signal for controlling the gain of amplifier 41 for maintaining the burst signal level constant. Variable gain amplifier 41 alters the amplification or gain in accordance with the control signal so that color signal CS9 will be maintained at a constant level. Second feedback loop 53 comprises variable gain amplifier 41 and burst detector 43. Second feedback loop 53 restrains the variation in level of color signal CS9 caused by removing the cross-talk components, by filter 39, and supplies the next processing stage with a signal having a constant level.

In accordance with this embodiment, second feedback loop 53 compensates the color signal for losses caused by removal of cross-talk components while first feedback loop 51 restrains the variation in level of the output color signal (CS5) independently of cross-talk components, even in the EP mode. Consequently, it is unnecessary for frequency converter 33 and band-pass filter 35 to have a large dynamic range. In other words, both frequency converter 33 and band-pass filter 35 can perform with twice the efficiency of such elements operating in the SP mode. As a result, disturbances such as carrier leaks in frequency converter 33 and noise in band-pass filter 35 can be reduced to approximately half of those occurring in the prior art circuits. In addition, since second feedback loop 53 is constructed without comb filter 39 having a large time delay and variable gain amplifier 41 having only a small amount of gain control, it is possible to increase the response of the feedback loop. For this reason, flicker is reduced. Due to its fast response the AGC circuit is capable of controlling differences among the reproduction levels of various magnetic heads used in VCRs. Furthermore, since second feedback loop 53 compensates the gain shifts of comb filter 39, filter 39 can be more freely designed.

As described above, the present invention provides an AGC circuit in which an optimum dynamic range can be set regardless of noise, such as cross-talk, of the processed signal. Moreover, the present invention provides an AGC circuit in which the feedback loop response can be increased.

Although the invention has been described in connection with a preferred embodiment thereof, those skilled in the art will recognized that numerous adaptations and modifications may be made thereto without department from the spirit and scope of the invention, as set forth in the following claims.

I claim:

1. Automatic gain control circuit for processing an input signal and providing an output signal having a stabilized level, said automatic gain control circuit comprising:

a first feedback loop for receiving and amplifying said input signal and for providing a first signal having a first level, said first feedback loop controlling amplification and stabilizing said first level in response to said first signal;

a noise filter for receiving said first signal and reducing noise contained within said first signal, and for providing a second signal; and a second feedback loop for receiving and amplifying said second signal and for providing said output signal having a second level, said second feedback loop controlling amplification and stabilizing said second level in response to said output signal, wherein said second level will approximately equal said first level.

2. Automatic gain control circuit as claimed in claim 1, wherein said first feedback loop comprises:

a first amplifier having a variable amplification for amplifying said input signal in accordance with a first control signal; and a first detector for detecting said first signal and providing said first control signal which varies in response to said first level of said first signal, and wherein said second feedback loop comprises:

a second amplifier having a variable amplification for amplifying said second signal in accordance with a second control signal; and a second detector for detecting said output signal and providing said second control signal which varies in response to said second level of said output signal.

3. Automatic gain control circuit as claimed in claim 2, wherein said first feedback loop further comprises:

a frequency converter for receiving an amplified signal from said first amplifier and converting the frequency of said amplified signal, and for providing a frequency convened signal; and a band-pass filter for receiving said frequency converted signal and extracting a specified frequency component signal from said frequency converted signal, and for supplying said specified frequency component signal as said first signal to both said first detector and said noise filter.

4. Automatic gain control circuit as claimed in claim 3, wherein said input signal is a color signal reproduced from a magnetic tape of a video cassette, and said noise filter is a comb filter for reducing cross-talk.

5. Electrical apparatus for processing an input signal and providing an output signal having a stabilized level, said electrical apparatus comprising:

first feedback means for receiving and amplifying said input signal and for providing a first signal having a first level, said first feedback means detecting a first component of said first signal representing said first level, and controlling amplification of said input signal and stabilizing said first level in accordance with the detection of said first component;

noise reduction means for receiving said first signal and reducing noise included in said first signal, and for providing a second signal; and second feedback means for receiving and amplifying said second signal and for providing said output signal having a second level, said second feedback means detecting a second component of said output signal representing said second level, and controlling amplification of said second signal and stabilizing said second level in accordance with the detection of said second component, wherein said second level will approximately equal said first level.

6. Method for processing an input signal and providing an output signal having a stabilized level, said method comprising the steps of:

receiving and amplifying said input signal, and providing a first signal having a first level;

detecting a first component of said first signal representing said first level, and providing a first control signal;

controlling amplification of said input signal in accordance with said first control signal for stabilizing said first level;

reducing noise contained within said first signal, and providing a second signal;

amplifying said second signal, and providing said output signal having a second level;

detecting a second component of said output signal representing said second level, and providing a second control signal; and controlling amplification of said second signal in accordance with said second control signal for approximately equalizing said second level with said first level.

7. Method as claimed in claim 6, wherein said input signal is a color signal reproduced from a magnetic tape of a video cassette, and said noise includes cross-talk.

* * * * *